UNITED STATES PATENT OFFICE.

JOHANN B. FRIEDOLIN JUD, OF NEW YORK, N. Y.

IMPROVEMENT IN INKS IN THE FORM OF PASTE.

Specification forming part of Letters Patent No. 147,384, dated February 10, 1874; application filed May 31, 1873.

*To all whom it may concern:*

Be it known that I, JOHANN B. FRIEDOLIN JUD, of the city, county, and State of New York, have invented a certain Compound for the Preparation of Concentrated Writing-Ink, of which the following is a specification:

The object of my invention is to manufacture writing-ink in the form of a paste, which is so concentrated that it will absorb many times the amount of water, thus saving packages, space, and freight. It is also cheaper to manufacture, and does not oxidize metal pens or metal inkstands. It leaves no sediment, and dries quicker on paper than the ink at present in use.

To prepare my improved concentrated black ink, take four parts of bichromate of potash, pulverized, and mix with twenty-five parts of acetic acid, fifty parts of liquid extract of logwood, one-quarter part of picric acid, ten parts of pulverized sal sorrel, ten parts of mucilage, and one-quarter part of citrate of iron and mix well. The liquid extract of logwood is prepared by mixing three parts of an extract of common commercial quality with two parts of water.

My improved red ink is prepared by taking one part of red aniline mixed with ten parts of acetic acid, five parts of citric acid, and twenty-five parts of mucilage, all well mixed. For use, mix one part of the paste with sixteen parts of water.

My improved blue ink is prepared by taking two parts of aniline blue, mixed with ten parts of acetic acid, five parts of citric acid, and forty parts of mucilage, all well mixed. For use, mix one part of the paste with eight parts of water.

My improved violet ink is prepared with the same ingredients, in the same proportions as blue, with the difference that violet aniline is used instead of blue aniline.

My improved green ink is prepared by taking one part of aniline blue, three parts of picric acid, mixed with ten parts of acetic acid, three parts of citric acid, and eighty parts of mucilage. For use, one part of this paste is mixed with eight parts of water.

To prepare my concentrated copying-ink, take six parts of pulverized bichromate of potash, mixed with ten parts of acetic acid and two hundred and forty parts of liquid extract of logwood, and add a pulverized mixture of thirty parts of alum, twenty parts of sal sorrel, and twenty parts of mucilage. Mix well. For use, one part of this paste is mixed with four parts of hot water.

It is evident that a slight variation in the named proportions of ingredients will not materially affect the quality of the ink.

I desire to claim—

A writing-ink, in the form of paste, compounded and prepared of the hereinbefore-named ingredients, substantially in the proportions and for the purposes hereinbefore set forth.

JOHANN B. FRIEDOLIN JUD.

Witnesses:
ARMIN BRIEGLEB,
FRANKLIN BARRITT.